WAVE SHAPER FOR RADIO SIGNALING

Filed June 11, 1946

LESLIE NORDE
JACK SHAPIRO
INVENTORS.

BY John J. Rogan
ATTORNEY

Patented May 8, 1951 2,552,348

UNITED STATES PATENT OFFICE 2,552,348

WAVE SHAPER FOR RADIO SIGNALING

Jack Shapiro, Brooklyn, and Leslie Norde, Hempstead, N. Y., assignors, by mesne assignments, to Jefferson Standard Broadcasting Company, a corporation of North Carolina Application June 11, 1946, Serial No. 675,880

1 Claim. (Cl. 250—27)

This invention relates to wave signalling systems and more particularly to arrangements for modifying signal wave shapes at different parts of a system.

In the operation of such devices as radio signalling apparatus, it is sometimes necessary to use radio signals of one characteristic wave shape produced at one point to control circuits or devices which require signals of a different characteristic wave shape. Accordingly, it is necessary to interpose means to effect the required wave shape conversion.

Signal waves or pulses having a vertical leading edge and vertical trailing edge and a flat top are commonly referred to as square or rectangular waves. Such signals are commonly used in such devices as signal generators, devices associated with the products of rectified tone signals, and in telautograph and telegraphic apparatus.

In some cases it is desirable that these signals be applied to other apparatus in the shape of waves which have substantially linear leading and trailing edges equally inclined toward each other and with a flat top. Waves of such shape may be referred to as trapezoidal waves.

Accordingly, it is a principal object of this invention to provide apparatus for converting signal waves having vertical leading and trailing edges and a flat top, to flat top signal waves having substantially linear leading and trailing edges equally inclined toward each other and to the flat top wherein the transition time of the enclosed portions is independent of the frequency or pulse time of the waves to be converted.

It is also an object of this invention to provide a device for changing the shape of a rectangular-like signal wave to a trapezoidal-like signal wave of constant magnitude and which includes two electronic signal limiters, one of which is associated with the input to the device, and the other or second limiter associated with the output of the device, and wherein the transition time and amplitude of the output from the second limiter is dependent only upon the relative adjustment of the two limiters, provided the voltage input to the limiters is at least equal to the minimum operable voltage for which each is adjusted. Once the characteristic wave shape is obtained by relative adjustment of the limiters the amplitude of the final output may be controlled by attenuation of the output from the second limiter.

Other objects, features and advantages of this invention will suggest themselves to those skilled in the art and will be apparent from the following description taken in connection with the accompanying drawing, in which.

Like numerals refer to like parts throughout the several figures.

Figure 1:
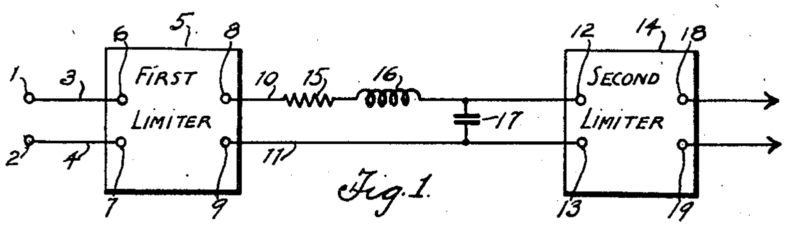
Fig. 1 is a schematic block diagram explanatory of the principles of this invention.

Referring now more particularly to Fig. 1, the input signal waves are received at terminals 1, 2, and fed through conductors 3, 4, into the first limiter 5, through terminals 6, 7. The output of the limiter 5 appears across terminals 8, 9, and is conveyed by conductors 10, 11, to the input terminals 12, 13, of the second limiter 14 after passing through the LCR circuit which comprises resistor 15, inductance 16, and capacitance 17. The output of the second limiter 12 appears across the terminals 18, 19.

Figure 1A:
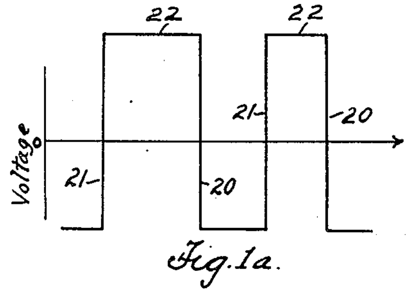
Fig. 1A shows the wave shape of energy which is fed into the first limiter or constant characteristic resistance attenuator shown in Fig. 1.

The signal voltage applied to the first limiter 5 at terminals 1, 2, is shown in Fig. 1A. This voltage is composed of a series or train of pulses of predetermined minimum value which are substantially rectangular in form having substantially vertical leading and trailing edges 20, 21 respectively and a horizontal or flat top 22.

Figure 1B:
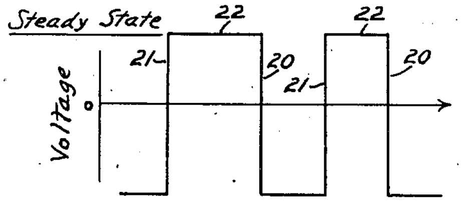
Fig. 1B shows the wave shape of energy which appears at the output of the first limiting device shown in Fig. 1.

Fig. 1B shows the wave form of the signal voltage after it has passed through the limiter 5, and as it appears at terminals 8, 9. It will be noted that this voltage is similar in every respect to the voltage input to the limiter shown in Fig. 1A except that it is of less but uniform magnitude. This is because the limiter 5 has performed its function of limiting the amplitude of its output. The amplitude of this voltage will remain constant so long as a predetermined minimum amplitude of the voltage shown in Fig. 1A is applied to terminals 1, 2.

Figure 1C:
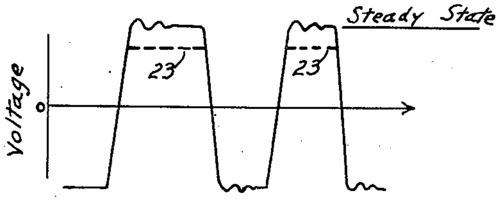
Fig. 1C shows the wave shape of the energy at the input to the second limiter shown in Fig. 1.

Fig. 1C shows the voltage wave form after passing through the LCR circuit and before it is fed into the second limiter 14 through terminals 12, 13. It will be noticed that neither the leading nor trailing edges 20, 21, is vertical, although they are substantially linear. These leading and trailing edges are inclined toward each other and have uneven crests and uneven valleys as a result of the action of the LCR circuit. Top 23 shown as a broken line is the level of the input to the second limiter 14 at which that limiter is set to limit and corresponds to the top 24 of Fig. 1D. Irrespective of the inherent amplification in the limiter 14 the transition time to top 24 is the same as that to top 23.

Figure 1D:
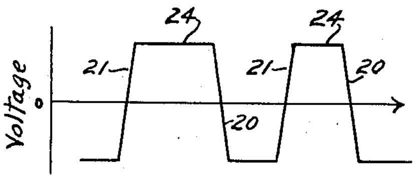
Fig. 1D shows the wave shape of the energy which appears at the output of the second limiter shown in Fig. 1.

The output of the system which appears across terminals 18 and 19 of the second limiter is shown in Fig. 1D. The leading edge 20 and trailing edge 21 of each wave of the train are in the form of a straight line and are equally inclined toward each other. Since the top 24 of each wave is flat, the waves have the desired trapezoidal-like shape.

The resistance of the LCR circuit includes the resistance of the first limiter 5 as measured across its output terminals 8, 9, and also whatever additional resistance may be required to regulate the period of oscillation and the damping of oscillations in the manner described hereinbelow. The LCR circuit is resistance-coupled to the second limiter 14. This resistance should be sufficiently high to prevent any material alteration in the characteristics of the LCR circuit.

The natural period of oscillation of the LCR circuit in seconds "T" is dependent upon the relative values of the components comprising the LCR circuit and is given by the following expression:

$$T=\frac{2\pi\sqrt{LC}}{\sqrt{1-\frac{R^2}{4LC}}}$$

where L is the value of the inductance in the LCR circuit expressed in henries; C is the value of the capacity in the LCR circuit expressed in farads; and R is the value of the resistance in the LCR circuit expressed in ohms. The fractional first overswing of oscillation D defined as the ratio of the departure of the first oscillation beyond the new steady state value to the total change in steady state value given by the equation:

$$D=\frac{-RT}{e^{4L}}$$

where $e$ is the base of natural logarithms; R is the value of the resistance in the LCR circuit in ohms; T is the period of oscillation given by the above expression; and L is the value of the inductance in the LCR circuit in henries. The time, $t$, required to reach the steady state value on the first swing of oscillation is related to the period of oscillation T, as follows:

$$\frac{t}{T}=\frac{1}{2}-\frac{1}{2\pi}\tan^{-1}\frac{4\pi L}{RT}$$

where all of the members of the equation are as above described.

It can be shown that any sudden change in the voltage applied to the LCR circuit the transition to a steady state of the voltage charge on the condenser 17 can be made for all practical purposes substantially linear. It is very necessary that this be done if the output wave shape from the second limiter 14 is to have symmetrically sloped sides and be variable in transition time over a wide range. The latter criterion is met if the transition characteristic of the reactance-resistance network is linear for most of its transition time.

This substantial linearity may be achieved by selecting the degree of underdamping of the LCR circuit. In selecting this degree of underdamping, several factors are considered among which are the transition time, the relation of the value of the oscillations to the value of the desired limited voltage, and the instant when the oscillation is to be effectively damped. In order that the portion of the voltage selected be substantially linear in form, it follows that the value of voltage at the minimum of the oscillation must be greater than the voltage at which the limiting of oscillations is to be effective and also the damping must be completed before another change in the applied voltage occurs. Under these conditions the transition time is independent of the frequency of the applied voltage and of any change in that frequency.

Figure 2:
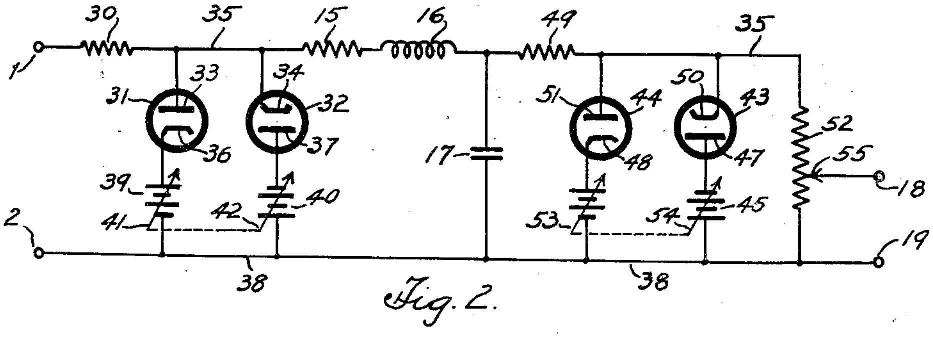
Fig. 2 is a circuit diagram of one embodiment of this invention using a diode limiter at its input and another diode limiter at its output.

One embodiment of this invention is shown in Fig. 2 which employs diode limiters before and after the LCR circuit.

One method of making the transition time independent of the magnitude of the initial voltage input to the apparatus is to use a limiter between the LCR circuit and the input. A voltage divider may be used across the output to adjust the fixed shaped voltage to any desired value.

Resistance 30 is a limiting resistor associated with diodes 31 and 32 which comprise the first or input diode limiter. This resistance is connected between the input terminals 1, 2, and diodes 31 and 32. The plate 33 and cathode 34, of diodes 31, 32 respectively, are connected to conductor 35 leading to terminal 1 through resistance 30. The cathode 36 and plate 37 of the respective diodes are connected to the conductor 38 through batteries 39, 40 respectively. The biasing potentials applied to diodes 31, 32, by batteries 39, 40 respectively, may be varied simultaneously by adjustment of suitable ganged controls 41, 42. Resistor 15 is the main resistor of the LCR circuit and should be of sufficiently high value to prevent any substantial change in resistance during the conduction of the diodes. Diodes 43, 44, are connected in parallel with each other through the biasing batteries 45 and 46 respectively, connected to plate 47 and cathode 48 of tubes 43 and 44. Resistance 49 preceding the output limiter has the same function as resistance 15. Cathode 50 and plate 51 of tubes 43 and 44 respectively, are connected between resistance 49 and output potentiometer 52. Biasing potentials applied to diodes 43 and 44 may be varied simultaneously by adjustment of suitable ganged controls 53 and 54.

The output potentiometer 52 is connected to conductor 35 at one end and to conductor 38 associated with output terminal 19 at its other end. The adjustable contact 55 which is part of the potentiometer 52 is connected at its other end to the other output terminal 18. By adjustment of contact 55, the output appearing across terminals 18 and 19 may be fixed at any desired value. The wave shape of this output is independent of the input amplitude and frequency at terminals 1, 2. This output is dependent only upon the relative operable adjustment of the diode limiters. Once the characteristic wave shape shown in Fig. 1D is obtained by relative adjustment of limiters 5 and 14, the amplitude of the final output may be controlled by attenuation of the output of diode tubes 43 and 44 of second limiter 14. The required attenuation control is provided by potentiometer 52.

It is understood that various changes and modifications may be made in the disclosed embodiments without departing from the scope of the invention.

What is claimed is:

An arrangement for shaping signals having vertical leading and trailing edges and a flat top, into signals having straight leading and trailing edges equally inclined toward one another and joined by a flat top, two input terminals and two output terminals and two conductors connected therebetween one conductor connecting said input terminals to one of said output terminals and the other conductor connecting the other of said input terminals to the other of said output terminals, one of said conductors having a plurality of resistances and at least one inductance connected in series therewith, two electronic amplitude limiters connected across said conductors one being associated with the input terminals and the other being associated with the output terminals, each comprising a plurality of diode vacuum tubes connected in parallel with each other for full wave rectification across said conductors, capacitative means connected across said conductors, an output potentiometer connected in parallel with the said limiter associated with said output whereby said output is independent of the amplitude and frequency of the energy impressed across said input terminals.

JACK SHAPIRO.
LESLIE NORDE.

REFERENCES CITED

The following references are of record in the file of this patent:

UNITED STATES PATENTS

| Number | Name | Date |
|---|---|---|
| 1,933,219 | Nakajima et al. | Oct. 31, 1933 |
| 2,179,607 | Bedford | Nov. 14, 1939 |
| 2,266,668 | Tubbs | Dec. 16, 1941 |

FOREIGN PATENTS

| Number | Country | Date |
|---|---|---|
| 553,195 | Great Britain | May 11, 1943 |